Patented Apr. 29, 1941

2,240,348

UNITED STATES PATENT OFFICE 2,240,348

PRINTED SAUSAGE CASING AND THE LIKE

John H. Payton, Chicago, Ill., assignor to Armour and Company, Chicago, Ill., a corporation of Illinois No Drawing. Application February 1, 1938,
Serial No. 188,187

4 Claims. (Cl. 41—33)

This invention relates to printed sausage casings and like animal casing materials for food products.

Hitherto it has been difficult to apply markings such as the manufacturer's name, trademark, or similar inscriptions to animal casings either before or after the casing is stuffed with the food product. Many unsuccessful attempts have been made to print directly upon natural casings made from animal intestines, bladders, bungs, weasands and the like. As noted in the prior art, direct printing upon natural casings prepared from animal tissue material is inherently frought with difficulty due to the nature of the tissue. Consequently, the prior art has been obliged to rely upon tags attached to the encased meat product, or on very special expensive methods of applying printed inscriptions to animal casings. For example, it has been suggested in the prior art to mark animal casings with special marking inks containing protein precipitants. Other ways hitherto used embrace treating the casing with formaldehyde, coating the treated surface with viscose and regenerating the cellulose, in this way the viscose-coated surface can be printed satisfactorily. Still other ways embrace transferring the indicia or other writing from a sheet of Cellophane to a wet casing before the casing is filled.

None of these ways meet all commercial requirements because in most of them it is necessary to mark the casing before the casing is stuffed with the food product, such as sausage meat. What the art has desired is some way of printing on casings of this type by a method applicable to the stuffed casing as well as to the casing before filling. In addition, any mark applied should be of such character that it will withstand normal handling, will be substantially permanent and waterproof, and will permit the printed, stuffed casing and contents to be smoked in the usual way. The printing method must be quick, require no complicated equipment, or skilled operatives, and must also be one which will meet the approval of Government regulations governing edible products.

I have now discovered a marking method which obviates all the difficulties of the prior art and meets all requirements given above. In broad aspects my invention consists in applying to the casing, either before or after stuffing, an ordinary transfer sheet coated with a heat-transferable pigment color, with the colored coating next to the casing, and applying a heated die bearing the markings desired to the transfer sheet whereby the color material is transferred to the casing in exact configuration of the die.

The transfer sheets which I use are strips of a paper or Cellophane base coated on one surface with a heat-transferable color mixture generally composed of an inorganic pigment and a gummy binder which melts or softens at the temperature of the heated die. Such transfer sheets are old and well known. Zinc white, barium carbonate, and similar pigments are most generally used. When it is desired to have the marking in colors this may be done by adding a suitable coloring matter to the pigment base. Such coloring matters are carmine, colored inorganic pigments and the like.

The die itself will carry on its face any desired inscription to be transferred to the animal casing. This can be a word indicating the origin of the food product, a trade-mark, symbol, grade mark, and any other type of inscription which can be imparted to a die.

Devices for facilitating marking in this manner are available. These generally consist of a die with means to heat it, such as a built-in electrical resistance unit, and a roll of transfer paper arranged to feed across the surface of the die.

Application of the inscription to the animal casing is a very simple matter. As stated, the transfer paper is placed next to the surface of the casing with the coated side down and the heated die is pressed against the upper surface of the paper. This takes but a moment and because of the versatility of my process it can be used for inscribing on casings either before or after stuffing, and after smoking if desired, or at any other stage in the manufacture of the stuffed casing.

Because of the inherent characteristics of the coating compound the inscription on the casing is substantially permanent and is unaffected by atmospheric influences, moisture, smoking and other environmental conditions.

My process has never hitherto been applied in the art of inscribing on animal casing materials. Instead, complicated methods involving the use of cellulose films and special printing inks have been employed. This is probably for two reasons, hitherto no one has believed it possible that a pigment material of the kind used in transfer papers for application by heat transfer methods would be satisfactory because of doubt about the permanence of such inscriptions when applied to substantially dry casings. Second, it has been uniformly considered undesirable to apply heated dies to an animal casing because of the inherent nature of the animal casing. These animal casings are composed of proteins which are notoriously heat-susceptible. In spite of these conclusions of the prior art I have discovered that the animal casing is damaged in no way by the application of a heated die and, moreover, the inscription is permanent under all conditions of use. Commercially, the present invention offers many advantages because, as stated, the process is so versatile that it can be used at any stage in the preparation of a casing-stuffed food product.

The temperature of the heated die is subject to great variation. Generally this temperature will be considerably higher than that required to transfer the pigment and its binder to the casing, but since the contact is very brief no damage can possibly result. Moreover, the inscription is clear-cut and is as readable as printing on paper would be.

As stated above, the coating composition used on the transfer paper involves nothing unique. These coating compositions use gelatin, and various other gummy binders, for holding the particles of pigment together.

I apply the inscription to the animal casing material while the casing is dry or substantially so. I do not apply water-soluble inks to a wet or moist casing as suggested hitherto.

Having thus described my invention, what I claim is:

1. The process of inscribing on substantially dry animal casings which comprises applying a transfer sheet having a coated heat-transferable surface to the animal casing with the coated surface in contact therewith, and applying a heated die carrying the inscription it is desired to transfer to the casing to cause the inscription carried by the die to be transferred from the transfer sheet to the animal casing.

2. The process as in claim 1 wherein the inscription is applied to a stuffed animal casing while substantially dry.

3. The process of producing a marked sausage product which comprises placing a stuffed natural animal casing having a substantially dry outer surface into marking relationship with a heated die and a transfer sheet carrying a coating of a heat-transferable pigment material interposed between the die and the casing, and causing the inscription on the die to be transferred from the transfer sheet to the casing by pressing the casing and die together.

4. A sausage product comprising a stuffed animal casing carrying an inscription on the outer surface thereof, said inscription being composed of an inorganic pigment and a gummy binder which softens by heat, and which has been transferred to the casing from a transfer sheet carrying a heat-transferable coating material.

JOHN H. PAYTON.